(12) United States Patent
Chen et al.

(10) Patent No.: US 10,459,437 B2
(45) Date of Patent: Oct. 29, 2019

(54) AIR-GROUND HETEROGENEOUS ROBOT SYSTEM PATH PLANNING METHOD BASED ON NEIGHBORHOOD CONSTRAINT

(71) Applicant: WUHAN UNIVERSITY OF SCIENCE AND TECHNOLOGY, Hubei (CN)

(72) Inventors: Yang Chen, Hubei (CN); Yanping Tan, Hubei (CN); Huaiyu Wu, Hubei (CN); Lei Cheng, Hubei (CN); Minghao Jiang, Hubei (CN); Wen Long, Hubei (CN)

(73) Assignee: WUHAN UNIVERSITY OF SCIENCE AND TECHNOLOGY, Hubei (CN)

( * ) Notice: Subject to any disclaimer, the term of this patent is extended or adjusted under 35 U.S.C. 154(b) by 25 days.

(21) Appl. No.: 15/739,756

(22) PCT Filed: Apr. 1, 2017

(86) PCT No.: PCT/CN2017/079181
§ 371 (c)(1),
(2) Date: Dec. 25, 2017

(87) PCT Pub. No.: WO2017/202141
PCT Pub. Date: Nov. 30, 2017

(65) Prior Publication Data
US 2018/0267524 A1    Sep. 20, 2018

(30) Foreign Application Priority Data
May 24, 2016    (CN) .......................... 2016 1 0349120

(51) Int. Cl.
*G05D 1/00* (2006.01)
*A01B 69/04* (2006.01)
(Continued)

(52) U.S. Cl.
CPC ......... *G05D 1/0005* (2013.01); *B64C 39/024* (2013.01); *B64F 1/364* (2013.01);
(Continued)

(58) Field of Classification Search
CPC . G05D 1/00; G05D 1/02; G01C 22/00; A01B 69/04
See application file for complete search history.

(56) References Cited

U.S. PATENT DOCUMENTS

| | | | | |
|---|---|---|---|---|
| 2007/0233338 | A1* | 10/2007 | Ariyur | G05D 1/0274 701/23 |
| 2014/0195095 | A1* | 7/2014 | Flohr | G05D 1/0011 701/25 |
| 2016/0157414 | A1* | 6/2016 | Ackerman | A01B 69/008 701/25 |

FOREIGN PATENT DOCUMENTS

| | | |
|---|---|---|
| CN | 101045298 | 10/2007 |
| CN | 102856827 | 1/2013 |

(Continued)

OTHER PUBLICATIONS

Klauco et al., "An Optimal Path Planning Problem for Heterogeneous Multi-Vehicle Systems," Int. J. Appl. Math. Comput. Sci., Jul. 2016, pp. 297-308.

(Continued)

*Primary Examiner* — Yuri Kan
(74) *Attorney, Agent, or Firm* — JCIPRNET

(57) ABSTRACT

The present invention relates to an air-ground heterogeneous robot system path planning method based on a neighborhood constraint. A smallest heterogeneous robot system is formed by a ground mobile robot and an air flying robot. The steps of the method include the ground mobile robot and the air flying robot start from a start point at the same time, successively access N sub-task points for executing sub-tasks and finally reach a destination together. In the present (Continued)

invention, it is considered that the position of each sub-task point is allowed to be effective in a certain neighborhood, and a neighborhood constraint is introduced. In addition, the maximum speed constraints are considered respectively for the air flying robot and the ground mobile robot. In the present invention, the air-ground heterogeneous robot system is enabled to fully utilize respective characteristics to realize advantage complementation, tasks are completed within a specific neighborhood range, the efficiency of path planning is improved, resources are saved, and the air-ground heterogeneous robot system path planning method is applicable to the fields such as marine cooperative rapid rescue, target identification and communication networking, cooperative environment sensing and positioning, so that the method has a wide application prospect.

5 Claims, 2 Drawing Sheets

(51) Int. Cl.
    *G05D 1/02*     (2006.01)
    *G01C 22/00*     (2006.01)
    *B64C 39/02*     (2006.01)
    *B64F 1/36*     (2017.01)
    *G05D 1/04*     (2006.01)
    *G05D 1/10*     (2006.01)
    *G08G 5/00*     (2006.01)

(52) U.S. Cl.
    CPC .......... *G05D 1/0217* (2013.01); *G05D 1/042* (2013.01); *G05D 1/101* (2013.01); *G08G 5/00* (2013.01); *B60L 2200/10* (2013.01); *B64C 2201/141* (2013.01); *B64C 2201/208* (2013.01); *Y02T 10/7005* (2013.01); *Y10S 901/01* (2013.01)

(56) References Cited

FOREIGN PATENT DOCUMENTS

CN     104536454     4/2015
CN     106020189     10/2016

OTHER PUBLICATIONS

Klauco et al., "Mixed-Integer SOCP Formulation of the Path Planning Problem for Heterogeneous Multi-Vehicle Systems," 2014 European Control Conference (ECC), Jun. 24-27, 2014, pp. 1474-1479.

Oravec et al., "Optimal Vehicle Routing with Interception of Targets' Neighbourhoods," European Control Conference 2015, Jul. 2015, pp. 1-7.

* cited by examiner

AIR-GROUND HETEROGENEOUS ROBOT SYSTEM PATH PLANNING METHOD BASED ON NEIGHBORHOOD CONSTRAINT

CROSS-REFERENCE TO RELATED APPLICATION

This application is a 371 application of the international PCT application serial no. PCT/CN2017/079181, filed on Apr. 1, 2017, which claims the priority benefit of China application no. 201610349120.1, filed on May 24, 2016. The entirety of each of the above-mentioned patent applications is hereby incorporated by reference herein and made a part of this specification.

BACKGROUND OF THE INVENTION

1. Field of the Invention

The present invention falls within the field of mobile robot path planning, and more particularly relates to a path planning method for an air-ground heterogeneous robot system based on a neighborhood constraint under movement constraint conditions.

2. Description of Related Art

With the scientific and technological progress, a robot technology is more and more closely related to human life. Particularly, because of the emergence of multiple novel robots, complicated tasks, which cannot be completed by a conventional single robot, but can be completed by means of cooperation of multiple robots. For example, a great number of studies on the cooperation of multiple robots, such as cooperative hunting, map building, co-coverage, target tracking, communication relay, information sensing, formation and networking, appear in decades. Past studies on a multi-robot system include more studies on a homogeneity robot system. Those heterogeneous robot systems usually possess extremely-different kinetics and kinematics due to robots thereof respectively have different functions, shapes, load capacities and movement capacities. When these individuals cooperate together, influences such as redundancy and coupling will be caused, thereby being extremely challenging.

A ground mobile robot and an air flying robot are two types of typical heterogeneous robots. The movement of the ground mobile robot is limited to a two-dimensional plane, and the air flying robot has a strong three-dimensional movement capacity. Under normal conditions, the air robot moves rapidly, responds fast, and is unlikely to be blocked by a ground barrier. However, hovering time is often limited, the self-positioning accuracy is relatively low, and the obtained target information accuracy is also low. The ground robot can carry a great number of materials, can pass through a narrow passage to complete a task while walking, can accurately identify and track a target, and can even complete other precise tasks. However, the ground robot is likely to be blocked by a ground barrier, and cannot obtain global image information due to a single angle of view during collection of image information of the target. Therefore, respective advantages of the air robot and the ground robot on function allocation must be taken into consideration for the problem of path planning. This brings a new challenge to studies on heterogeneous systems.

The current existing heterogeneous robot system path planning methods are mainly divided into two classes. The first class refers to: building a combined optimization model, and then solving by means of a heuristic method, where only a second-best solution can be obtained due to high complexity in most cases. The second class is a method based on a mathematical planning model, which is greatly advantageous in efficiency calculation, but a great number of simplifications and assumptions are needed usually. Regardless of a combined optimization method or a mathematical optimization method among the existing methods, each target points to be accessed serves as an accurate position. In practical application, the target point is a range or a neighborhood usually. For example, a rescue place and a material putting place are allowed to be effective within a certain range, and a too accurate task plan does not facilitate efficiency improvement.

SUMMARY OF THE INVENTION

In order to solve the above-mentioned technical problem, the present invention provides an air-ground heterogeneous robot system path planning method based on a neighborhood constraint. Access to task points within a neighborhood constraint range improves the efficiency of path planning, and reduces the complexity of a path planning method.

To solve the above-mentioned technical problem, the present invention adopts the following technical solution.

A planning method of an air-ground heterogeneous robot system based on a neighborhood constraint (also referred to as an air-ground heterogeneous robot system path planning method based on a neighborhood constraint), wherein the heterogeneous robot system is formed by at least one ground mobile robot and at least one air flying robot. The method includes that the ground mobile robot and the air flying robot start from a start point at the same time, successively access N sub-task points for executing sub-tasks, and finally reach a destination together. In order to save energy, the ground mobile robot serves, in a set time period, as a mobile platform for carrying the air flying robot to move, when having received a sub-task, the air flying robot automatically takes off from the ground mobile robot to execute the sub-task, and after completing the sub-task, the air flying robot returns to the ground mobile robot to supplement energy, and accompanies with the ground mobile robot to move together so as to continuously complete a next sub-task. When the air robot flies to execute a certain sub-task, the ground mobile robot matching therewith moves on so as to coordinate and synchronize with the air flying robot as far as possible. After all the tasks are completed, all air flying robots return and land on ground mobile robots respectively matching therewith. In this process, it is necessary to calculate path points of the ground mobile robot and an entire track point where the flying robot takes off from the ground robot platform, and then returns after executing all the sub-tasks. By introducing a binary variable, each sub-task point is accessed successively, movement constraints for the ground robot and the air robot are built respectively, so as to establish a mixed integer planning model by taking minimum total time for access to all the sub-task points as a target function. The time (a set time period) is set as a period which is out of the sub-tasks executed by the air flying robot among the whole task, and on the premise of enabling the air flying robot and the around mobile robot to identify and position each other, each period of time for the air flying robot to execute a sub-task must be shorter than maximum hovering time of the air flying robot.

The air-ground heterogeneous robot system path planning method based on a neighborhood constraint mainly includes the following steps:

step 1: setting system parameters of the heterogeneous robot system: setting positions of a movement start point, a task point and a target point of the whole heterogeneous robot system, and a neighborhood range size specified by each sub-task point, respectively setting maximum movement speeds of the ground mobile robot and the air flying robot, and setting maximum hovering time of the air robot and minimum time parameters for supplementing energy;

step 2: establishing a mixed integer optimization model according to own constraint and mutual constraint conditions of air-ground heterogeneous robots, a specific process being as follows:

step 2-1: robots contained in the heterogeneous robot system start from a start point together by introducing a binary variable to ensure that each sub-task point must be accessed once and can be accessed once at most;

step 2-2: when the heterogeneous robot system moves together to a certain place, the air flying robot leaving a carrying platform to execute a task individually, so as to complete accesses to neighborhood ranges of one or more sub-task points under constraint conditions of satisfying the maximum hovering time and the maximum movement speed of the air flying robot;

step 2-3: during the process in the step 2-2, the ground robot still moves along a straight path at a maximum speed, and satisfies the constraint condition of the maximum movement speed;

step 2-4: after completing the task, the flying robot returns to and lands on a platform of the ground mobile robot, supplements energy in a process of moving forward along with the ground mobile robot so as to be prepared for coming of a next task, wherein in order to ensure smooth completeness of the task and to avoid giving up halfway, the air robot can take off again only after being completely charged, it is necessary to satisfy a shortest charging time constraint during charging, and the ground robot still needs to ensure a maximum movement speed constraint in the whole cooperative movement process;

step 2-5: repeating the step 2-2, the step 2-3 and the step 2-4 until the heterogeneous robot system completes accesses to all the sub-task points, so as to finally reach the target point together;

step 2-6: finally, establishing the target function at the cost of minimum total time for completing accesses to all the sub-task points;

step 2-7: establishing a mixed integer nonlinear planning model by the constraint conditions and the target function obtained in the step 2-1 to the step 2-6; and step 3: planning a path according to the established mixed integer optimization model, and executing the planned path by utilizing the heterogeneous robot system.

In the above-mentioned technical solution, in the step 1, the heterogeneous robot system is set to successively access a plurality of sub-task points: $T_1, T_2, \ldots, T_N$, and finally reaches a destination $T_e$ together; and the ground mobile robot moves at a maximum speed $v_{c,max}$, and the air flying robot moves at a maximum speed $v_{h,max}$.

In the above-mentioned technical solution, in the step 2-2, a neighborhood of the sub-task point $T_i$ takes the point $T_i$ as a center of a circle and takes $R_i$ as a radius of the circle to form a circular analysis window, wherein $T_i$ is a neighborhood center, and $R_i$ is a neighborhood radius. Access of the air flying robot to a certain sub-task point only needs to fall within a neighborhood range of the certain sub-task point.

In the above-mentioned technical solution, in the step 2-2, if the air flying robot accesses a plurality of sub-task points at the same time, each sub-task point $T_i$ probably has different neighborhood radius, namely, different circular region in size.

Compared with the prior art, the air-ground heterogeneous robot system path planning method based on a neighborhood constraint provides a mixed integer planning model with a neighborhood constraint, such that when cooperating, an air robot and a ground robot can play respective advantages to execute more complicated tasks. The efficiency of path planning is improved, the complexity of an algorithm is reduced, and the aim of saving energy is achieved to a certain extent. The air robot that executes a task can return after completing the task within a neighborhood according to own constraint conditions and mutual constraint conditions with a ground mobile platform, thereby saving time and energy, completing more tasks within the same time period, and greatly improving the operating efficiency.

DESCRIPTION OF THE EMBODIMENTS

In order to further describe the technical solution of the present invention, the present invention will be elaborated hereinafter with reference to FIG. 1-3 without being limited.

Figure 1:
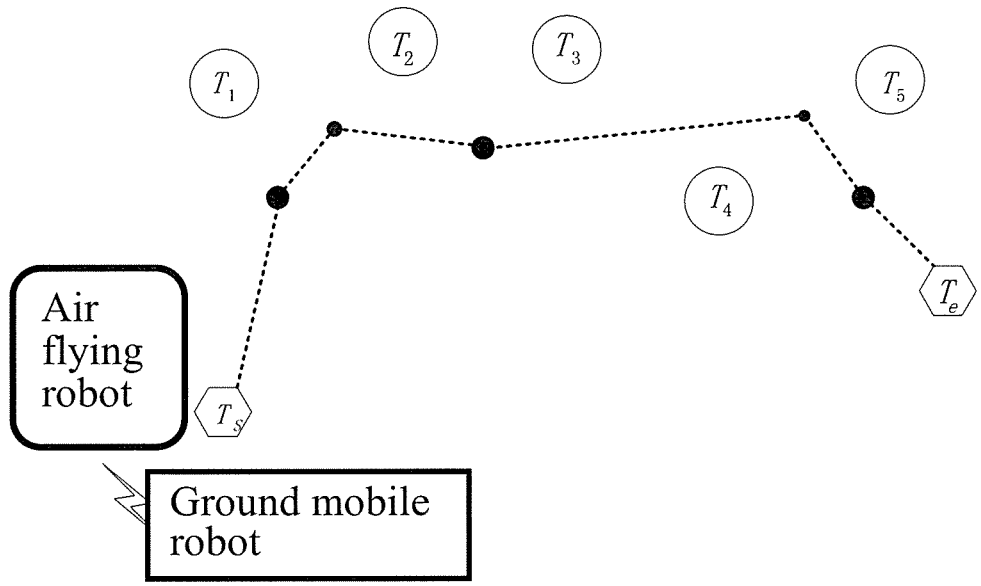
FIG. 1 is a diagram illustrating path planning for an air-ground heterogeneous robot system according to the present invention.

FIG. 1 is a diagram illustrating path planning for an air-ground heterogeneous robot system. A ground mobile robot (ground robot) carrying an unmanned aerial vehicle (air flying robot/air robot) starts from $T_S$, successively accesses N sub-task points $T_1, T_2, \ldots, T_N$, and finally reaches a destination $T_e$ together, where a dotted line represents a path of a ground robot, and a solid circle around each sub-task point represents a respective neighborhood range. In the heterogeneous robot system, the ground mobile robot moves within a large range at a maximum speed $v_{c,max}$; a maximum movement speed of the unmanned aerial vehicle is $v_{h,max}$, the running speed is quick but the range is limited; and both the ground mobile robot and the unmanned aerial vehicle move at a constant speed.

An air-ground heterogeneous robot system path planning method based on a neighborhood constraint specifically includes the following steps:

step 1: setting system parameters of a heterogeneous robot system: setting positions of a movement start point, a task point and a target point of the whole system, and a neighborhood range specified by each sub-task point, respectively setting maximum movement speeds of a ground mobile robot and an air flying robot, and setting maximum hovering time of the air robot and minimum time parameters for supplementing energy, specific setting being as follows:

step 1-1: setting positions of the movement start point $T_S$, N sub-task points and a target point $T_e$ of the heterogeneous robot system, as shown in table 1 (N=4):

TABLE 1

Coordinates of start point, target point and each
sub-task point of path planning (unit: km)

| Sequence number | $T_s$ | $T_1$ | $T_2$ | $T_3$ | $T_4$ | $T_e$ |
|---|---|---|---|---|---|---|
| Coordinates $(x_i, y_i)$ | (0, 0) | (0, 40) | (0, 50) | (46, 46) | (30, 0) | (50, 0) | step 1-2: setting a neighborhood range of each sub-task point as a circular region of the same size, and setting a radius to be 3 km;

step 1-3: respectively setting maximum movement speeds of the ground mobile robot and the air flying robot to be 18 km/h and 90 km/h, setting the maximum hovering time of the air flying robot to be 21 min, and setting the shortest time for completing charging each time to be 10 min;

step 2: establishing a mixed integer optimization model according to own constraint and mutual constraint conditions of air-ground heterogeneous robots, a specific process being as follows:

step 2-1: robots contained in the heterogeneous robot system starting from a start point together by introducing a binary variable to ensure that each sub-task point must be accessed once and can be accessed once at most, a specific implementation method being as follows:

defining an N×N-dimension binary variable matrix $\alpha_{i,j} \in \{0,1\}$, where $\alpha_{i,j}=1$ represents that the unmanned aerial vehicle successively accesses task points $T_i, T_{i+1}, \ldots, T_j$, $1 \leq i \leq j \leq N$, and under other situations, $\alpha_{i,j}=0$, so $$\sum_{i=1}^{k} \sum_{j=k}^{N} \alpha_{i,j} = 1 \quad (1)$$

where $k = 1, 2, \ldots, N$;

step 2-2: when reaching a certain place, the air flying robot (e.g., UAV) leaves a carrying platform (e.g., the ground mobile matching the air flying robot) to execute a task individually, so as to complete access to one or more sub-task points within different neighborhood ranges under constraint conditions of satisfying the maximum hovering time and the maximum movement speed of the air flying robot, a specific implementation method including the following steps:

step 2-2-1: as the air flying robot must return to the ground robot for supplementing energy in time before energy is exhausted due to carrying of limited energy, defining a variable matrix $f \in R^N$, where $f_i \geq 0$ represents elapsed time in which the unmanned aerial vehicle takes off from a point $t_i \in R^2$, successively accesses sub-task points $T_i, T_{i+1}, \ldots, T_j$, and finally lands on a point $l_j \in R^2$, and when taking off for executing a task each time, the air flying robot must satisfy the maximum hovering time constraint:

$$\alpha_{i,j} f_i \leq t_{h,max} \quad (2)$$

Wherein $t_{h,max}$ represents allowed maximum hovering time $1 \leq i \leq j \leq N$;

step 2-2-2: by introducing a concept of a task point neighborhood, so that an access of a robot to a sub-task point only needs to fall within a neighborhood of the sub-task point, thereby saving access time; supposing that a neighborhood point of a task point $T_i$ is $w_i$, satisfying the following relationship:

$$\|T_i - w_i\|^2 \leq R_i^2 \quad (3)$$

where $R_i$ is a neighborhood range parameter of a sub-task point $T_i$, and it is supposed that the neighborhood is a circular region;

step 2-2-3: supposing that $d_{i,j}$ represents a distance of access of the unmanned aerial vehicle from a neighborhood point $w_i$ of a sub-task point $T_i$ to a neighborhood point $w_j$ of a sub-task point $T_j$, shown as follows:

$$d_{i,j} = \sum_{k=i}^{j-1} p_k \quad (4)$$

wherein $$p_i = \|w_i - w_{i+1}\|, i = 1, 2, \ldots, N-1 \quad (5)$$

when $i \geq j$, $d_{i,j}=0$;

step 2-2-4: when the air flying robot successively accesses neighborhood points $w_i, w_{i+1}, \ldots, w_j$ of a plurality of sub-task points after taking off, making the maximum movement speed of the air flying robot satisfy the following constraint:

$$\frac{\alpha_{i,j}(\|t_i - w_i\| + d_{i,j} + \|w_j - l_j\|)}{f_i} \leq v_{h,max} \quad (6)$$

i.e., $$\alpha_{i,j}(\|t_i - w_i\| + d_{i,j} + \|w_j - l_j\|) - v_{h,max} f_i \leq 0$$

step 2-3: during the process in the step 2-2, the ground mobile robot still moves along a straight path at a maximum speed, the air flying robot separates from the carrying platform to execute a task individually, taking off from point $t_i$, and landing on point $l_j$, so that within this period of flying time $f_i$, the ground mobile robot satisfies a maximum speed constraint:

$$\frac{\alpha_{i,j}\|t_i - l_j\|}{f_i} \leq v_{c,max} \quad (7)$$

i.e., $$\alpha_{i,j}\|t_i - l_j\| - v_{c,max} f_i \leq 0$$

wherein $v_{c,max}$, represents the maximum movement speed of the ground mobile robot, $1 \leq i \leq j \leq N$;

step 2-4: after completing the task, the air flying robot returns to and lands on the platform of the ground mobile robot, supplements energy in a process of moving forward along with the ground mobile robot so as to be prepared for coming of a next task, where it is necessary to satisfy a shortest charging time constraint during charging, and moreover, the ground mobile robot still needs to ensure a maximum movement speed constraint in the whole cooperative movement process, a specific implementation method including the following steps:

step 2-4-1: in order to ensure smooth completeness of the task and to avoid giving up halfway, the air flying robot may be allowed to take off again only after the charging has been completed, wherein if the minimum time needed for completing energy supplementation is $t_{r,min}$, it is also necessary to satisfy the following constraint:

$$t_{r,min} \alpha_{i,j} - s_j \leq 0 \quad (8)$$

Where $1 \leq i \leq j \leq N-1$;

step 2-4-2: when the unmanned aerial vehicle does not go out to execute the task, keeping it landing and staying on the platform of the ground mobile robot to move together, supposing that coordinates of a landing point are $l_j$, i.e., the unmanned aerial vehicle has just accessed a task point $T_j$ and moves together with the mobile platform until reaches a next take-off point with coordinates $t_{j+1}$, and defining a variable matrix $s \in R^{N-1}$, wherein $s_j \geq 0$ represents time for movement of the air flying robot staying on the platform, and the movement of the ground mobile robot within this period of time must satisfy a maximum movement speed constraint:

$$\frac{\alpha_{i,j}\|l_j - t_{j+1}\|}{s_j} \leq v_{c,max} \quad (9)$$

i.e., $$\alpha_{i,j}\|l_j - t_{j+1}\| - v_{c,max}s_j \leq 0$$

where $1 \leq i \leq j \leq N-1$;

step 2-5: repeating the step 2-2, the step 2-3 and the step 2-4 until the heterogeneous robot system completes accesses to all the sub-task points, so as to finally reach the target point together;

step 2-6: finally, establishing a target function at the cost of minimum total time for completing accesses to all the sub-task points, wherein the total spent time y consists of four parts:

time $$\frac{\|T_s - t_1\|}{v_{c,max}}$$

for running of the air flying robot and the ground mobile robot together before the air robot takes off for the first time, the air flying robot moves together with the ground mobile robot for the time elapsed $$\frac{\|l_N - T_e\|}{v_{c,max}}$$

which is from last time the air flying robot lands on the ground mobile robot to the arrival of the target point;

total time $$\sum_{i=1}^{N} f_i$$

for flight of the air flying robot, and total time $$\sum_{j=1}^{N-1} s_j$$

elapsed by the ground mobile robot carrying the air flying robot in a process of accessing sub-task points $T_1$ to $T_N$, the final target function is shown in formula (10):

$$\min y = \frac{1}{v_{c,max}}(\|T_s - t_1\| + \|l_N - T_e\|) + \sum_{i=1}^{N} f_i + \sum_{j=1}^{N-1} s_j \quad (10)$$

step 2-7: establishing a mixed integer nonlinear planning model by the constraint conditions and the target function obtained in the step 2-1 to the step 2-6, the model is shown in formula (11):

$$\min_{\alpha, f, s, t, l, d, p} y \quad (11)$$

s.t. (1)□(5), (7)□(10), $\alpha_{i,j} \in \{0, 1\}, 1 \leq i, j \leq N$ $f_i \geq 0, 1 \leq i \leq N$ $s_j \geq 0, 1 \leq j \leq N-1$ $d_{i,j} \geq 0, 1 \leq i, j \leq N$ $p_i \geq 0, 1 \leq i \leq N-1$ step 3: obtaining a path planning result by utilizing an experiment method according to the established model, wherein a simulated program runs on a computer, obtains a final path planning result by means of a tool kit OPTI and a solver SCIP, and executes a planned path by utilizing the heterogeneous robot system.

Figure 2:
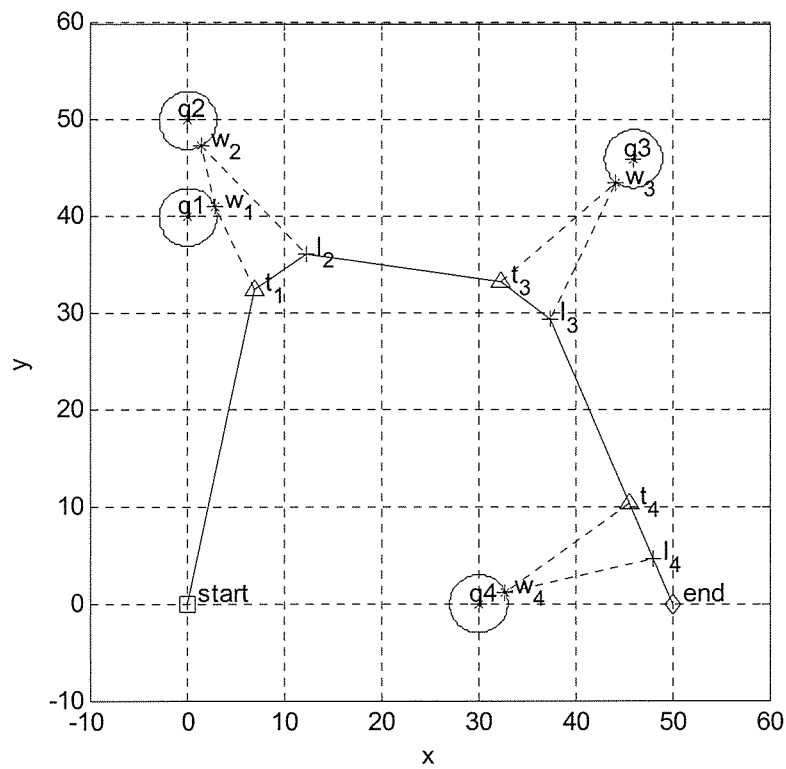
FIG. 2 is a path planning result about a heterogeneous robot system under neighborhood constraint conditions according to the present invention.

The model includes 66 decision variables and 207 constraints in total, and a movement path planning result of the robot is shown in FIG. 2, wherein four circles represent neighborhoods of the sub-task points respectively. The solved decision variable α is shown in formula (12), and the heterogeneous robot system spends 5.4595 h for completing the task. Coordinates of a separation point and a convergence point of the air flying robot and the ground mobile robot as well as coordinates of each neighborhood point are shown in table 2 and table 3 respectively.

$$\alpha = \begin{bmatrix} 0 & 1 & 0 & 0 \\ 0 & 0 & 0 & 0 \\ 0 & 0 & 1 & 0 \\ 0 & 0 & 0 & 1 \end{bmatrix} \quad (12)$$

TABLE 2

Coordinates of take-off point and landing point of air flying robot (unit: km)

| Take-off point | $t_1$ | $t_3$ | $t_4$ |
|---|---|---|---|
| Coordinates $(x_i, y_i)$ | (6.9859, 32.5145) | (32.3080, 33.2649) | (45.5446, 10.3401) |
| Landing point | $l_2$ | $l_3$ | $l_4$ |
| Coordinates $(x_i, y_i)$ | (12.1524, 36.1196) | (37.3145, 29.4406) | (48.0326, 4.5660) |

TABLE 3

| Coordinates of neighborhood access points (unit: km) | | | | |
|---|---|---|---|---|
| Neighborhood point | $w_1$ | $w_2$ | $w_3$ | $w_4$ |
| Coordinates $(x_i, y_i)$ | (2.8309, 40.9931) | (1.4144, 47.3543) | (44.1789, 43.6160) | (32.7171, 1.2323) |

From FIG. 2, it can be seen that the air robot leaves the ground robot at a point $t_1$, starts flying to a neighborhood point $w_1$ of a sub-task point $T_1$, accesses $w_1$, then flies to a neighborhood point $w_2$ of sub-task point $T_2$, finally converges with the ground robot at a point $l_2$, and lands on the ground robot to move together. Whilst the ground robot carries the air robot to move, the ground robot also supplements the air robot with energy. After a period of time, the air robot is completely supplemented with energy, takes off again at a point $t_3$, accesses a neighborhood point $w_3$ of a sub-task point $T_3$, and then returns to a point $l_3$ to converge with the ground robot, and so on, until all tasks are completed, and the ground robot carries the air robot to reach a destination. Elements evaluated as 1 in a variable $\alpha$ as shown in formula (12) include $\alpha_{1,2}, \alpha_{3,3}, \alpha_{4,4}$, representing that take-off points of the air robot are in front of accessed sub-task points $T_1, T_3, T_4$ respectively, and landing points are behind the accessed sub-task points $T_2, T_3, T_4$ respectively, in accordance with those as shown in FIG. 2.

Figure 3:
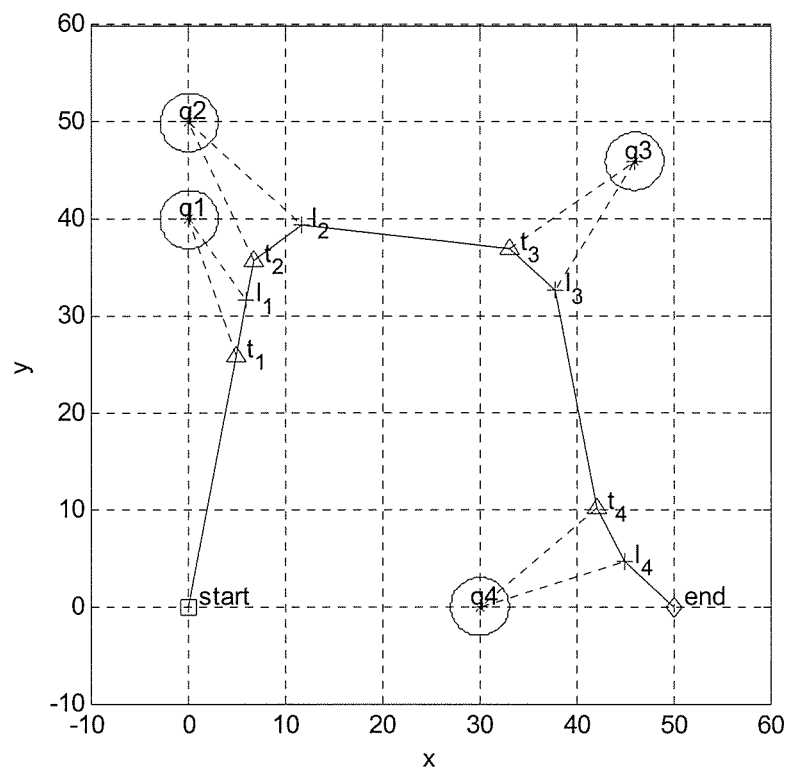
FIG. 3 is a path planning result about a heterogeneous robot system without adding a neighborhood constraint.

Without concerning a neighborhood constraint, the solved path is as shown in FIG. 3. The total time needed for completing the task is 5.9130 h, and is slightly longer than time in the method provided in the present invention. By comparing FIG. 2 with FIG. 3, it can be found out that the air robot adopts different policies for access to sub-task points $T_1$ and $T_2$. In the presence of a neighborhood constraint, the air robot will complete access to two neighborhood points $w_1$ and $w_2$ during one flight action. In the absence of a neighborhood constraint, since the distances to two sub-task points to be accessed are longer than the distances to neighborhood points thereof, the air robot completes the task at twice, and needs to return to the ground robot midway for supplementing energy once. Time needed for movement of the ground robot from $l_1$ to $t_2$ is 13.5896 min, where the ground robot supplements the air robot with energy for 10 min.

To sum up, the path planning method of the air-ground heterogeneous robot system based on a neighborhood constraint provides a mixed integer planning model with a neighborhood constraint, such that when cooperating, an air robot and a ground robot can play respective advantages to execute more complicated tasks. The efficiency of path planning is improved, the complexity of an algorithm is reduced, and the aim of saving energy is achieved to a certain extent.

What is claimed is:

1. A path planning method of an air-ground heterogeneous robot system based on a neighborhood constraint, wherein the air-ground heterogeneous robot system is formed at least by a ground mobile robot and an air flying robot, and the method comprises:

the ground mobile robot and the air flying robot start from a start point at the same time, successively access N sub-task points for executing sub-tasks, and finally reach a destination together;

in order to save energy, the ground mobile robot serves, in a set time period, as a mobile platform for carrying the air flying robot to move, when having received a sub-task, the air flying robot automatically takes off from the ground mobile robot to execute the sub-task, and after completing the sub-task, the air flying robot returns to the ground mobile robot to supplement energy, and accompanies with the ground mobile robot to move together so as to continuously complete a next sub-task;

when the air robot flies to execute a certain sub-task, the ground mobile robot matching therewith moves on so as to coordinate and synchronize with the air flying robot;

after all tasks are completed, all air flying robots return and land on ground mobile robots respectively matching therewith; in this process, it is necessary to calculate path points of the ground mobile robot and an entire track point where the flying robot takes off from the ground robot platform, and then returns after executing all the sub-tasks;

by introducing a binary variable, each sub-task point is accessed successively, movement constraints for the ground robot and the air robot are built respectively, so as to establish a mixed integer planning model by taking minimum total time for access to all the sub-task points as a target function; and the set time period is set as a period which is out of the sub-tasks executed by the air flying robot among whole task, and on a premise of enabling the air flying robot and the round mobile robot to identify and position each other, each period of time for the air flying robot to execute a sub-task must be shorter than maximum hovering time of the air flying robot.

2. The path planning method of the air-ground heterogeneous robot system based on a neighborhood constraint according to claim 1, comprising the following steps:

step 1: setting system parameters of the heterogeneous robot system: setting positions of a movement start point, a task point and a target point of the whole heterogeneous robot system, and a neighborhood range size specified by each sub-task point, respectively setting maximum movement speeds of the ground mobile robot and the air flying robot, and setting maximum hovering time of the air robot and minimum time parameters for supplementing energy;

step 2: establishing a mixed integer optimization model according to own constraint and mutual constraint conditions of air-ground heterogeneous robots, a specific process comprises:

step 2-1: robots contained in the heterogeneous robot system start from a start point together by introducing a binary variable to ensure that each sub-task point must be accessed once and can be accessed once at most;

step 2-2: when the heterogeneous robot system moves together to a certain place, the air flying robot leaving a carrying platform to execute a task individually, so as to complete accesses to neighborhood ranges of one or more sub-task points under constraint conditions of satisfying the maximum hovering time and the maximum movement speed of the air flying robot;

step 2-3: during the process in the step 2-2, the ground robot still moves along a straight path at a maximum speed, and satisfies the constraint condition of the maximum movement speed;

step 2-4: after completing the task, the flying robot returns to and lands on platform of the ground mobile robot, supplements energy in a process of moving forward along with the ground mobile robot so as to be prepared for coming of a next task, wherein, in order to ensure smooth completeness of the task and to avoid giving up halfway, the air robot can take off again only after being completely charged, it is necessary to satisfy a shortest charging time constraint during charging, and the ground robot still needs to ensure a maximum movement speed constraint in the whole cooperative movement process;

step 2-5: repeating the step 2-2, the step 2-3 and the step 2-4 until the heterogeneous robot system completes accesses to all the sub-task points, so as to finally reach the target point together, step 2-6: finally, establishing the target function at a cost of minimum total time for completing accesses to all the sub-task points;

step 2-7: establishing a mixed integer nonlinear planning model by the constraint conditions and the target function obtained in the step 2-1 to the step 2-6; and step 3: planning a path according to the established mixed integer optimization model, and executing the planned path by utilizing the heterogeneous robot system.

3. The path planning method of the air-ground heterogeneous robot system based on a neighborhood constraint according to claim 2, wherein in the step 1, the heterogeneous robot system is set to successively access a plurality of sub-task points: $T_1, T_2, \ldots, T_N$, and finally reaches, a destination $T_e$ together; and the ground mobile robot moves at a maximum speed $v_{c,max}$, and the air flying robot moves at a maximum speed $v_{h,max}$.

4. The path planning method of the air-ground heterogeneous robot system based on a neighborhood constraint according to claim 2, wherein in the step 2-2, a neighborhood of a sub-task point $T_i$ takes the point $T_i$ as a center of a circle, and takes $R_i$ as a radius of the circle to form a circular analysis window, wherein $T_i$ is a neighborhood center, and $R_i$ is a neighborhood radius; and access of the air flying robot to a certain sub-task point only needs to fall within a neighborhood range of the certain sub-task point.

5. The path planning method of the air-ground heterogeneous robot system based on a neighborhood constraint according to claim 2, wherein in the step 2-2, if the air flying robot accesses a plurality of sub-task points at the same time, each sub-task point $T_i$ has different neighborhood radius, namely, different circular region in size.

* * * * *